United States Patent
Wada

(10) Patent No.: US 11,195,535 B2
(45) Date of Patent: Dec. 7, 2021

(54) VOICE RECOGNITION DEVICE, VOICE RECOGNITION METHOD, AND VOICE RECOGNITION PROGRAM

(71) Applicant: TOYOTA JIDOSHA KABUSHIKI KAISHA, Toyota (JP)

(72) Inventor: Fumio Wada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 16/563,185

(22) Filed: Sep. 6, 2019

(65) Prior Publication Data

US 2020/0160871 A1 May 21, 2020

(30) Foreign Application Priority Data

Nov. 19, 2018 (JP) .............................. JP2018-216873

(51) Int. Cl.
*G10L 17/26* (2013.01)
*G10L 25/87* (2013.01)
*G10L 15/22* (2006.01)
*G10L 25/90* (2013.01)

(52) U.S. Cl.
CPC .............. *G10L 17/26* (2013.01); *G10L 15/22* (2013.01); *G10L 25/87* (2013.01); *G10L 25/90* (2013.01)

(58) Field of Classification Search
CPC .......... G10L 15/22; G10L 25/87; G10L 25/90
USPC ....................................................... 704/270
See application file for complete search history.

(56) References Cited

U.S. PATENT DOCUMENTS

| 4,761,815 A | * | 8/1988 | Hitchcock | ............... G10L 15/10 704/253 |
| 2008/0069517 A1 | * | 3/2008 | Arai | ...................... G11B 19/06 386/248 |
| 2014/0012575 A1 | * | 1/2014 | Ganong, III | ........ G10L 15/1815 704/239 |
| 2018/0352302 A1 | * | 12/2018 | Roe | ......................... G10L 15/22 |
| 2018/0357999 A1 | * | 12/2018 | Lee | ........................ G10L 25/51 |

FOREIGN PATENT DOCUMENTS

JP          2006-071794 A          3/2006

OTHER PUBLICATIONS

R. Rabenja, S. Amine and J. Davidson, "Speech recognition for game control," The 2nd Annual IEEE Northeast Workshop on Circuits and Systems, 2004. NEWCAS 2004., Montreal, QC, Canada, 2004, pp. 97-99, doi: 10.1109/NEWCAS.2004.1359028. (Year: 2004).*

R. Rabenja, S. Amine and J. Davidson, "Speech recognition for game control," The 2nd Annual IEEE Northeast Workshop on Circuits and Systems, 2004. NEWCAS 2004., Montreal, QC, Canada, 2004, pp. 97-99, doi: 10.1109/NEWCAS.2004.1359028. (Year: 2004) (Year: 2004).*

* cited by examiner

Primary Examiner — Bharatkumar S Shah
(74) *Attorney, Agent, or Firm* — Oliff PLC

(57) ABSTRACT

A voice recognition device includes a memory and a processor including hardware. The processor is configured to extract a feature of input voice data and set a duration of a silent state after transition of the voice data to the silent state. The duration is used for determining that an input of the voice data is completed.

9 Claims, 9 Drawing Sheets

VOICE RECOGNITION DEVICE, VOICE RECOGNITION METHOD, AND VOICE RECOGNITION PROGRAM

INCORPORATION BY REFERENCE

The disclosure of Japanese Patent Application No. 2018-216873 filed on Nov. 19, 2018 including the specification, drawings and abstract is incorporated herein by reference in its entirety.

BACKGROUND

1. Technical Field

The present disclosure relates to a voice recognition device, a voice recognition method, and a voice recognition program.

2. Description of Related Art

From a viewpoint of improving convenience of a user of a vehicle, voice of the user captured by way of a microphone is voice-recognized, and a car navigation system is operated or various search operations are started based on a voice recognition result. For example, in a case where the user speaks and utters an address as a destination, facility information prepared in advance is searched in the car navigation system or a voice recognition device connected to the car navigation system through a network. Then, a search result is displayed on a display screen of the car navigation system.

As the voice recognition device that can be introduced to the car navigation system, a technique that changes setting of a duration for determining the end of speech (that is, input completion of voice data) of the user according to a category of a search item is known (for example, see Japanese Unexamined Patent Application Publication No. 2006-71794 (JP 2006-71794 A)). The duration is a time for which a silent state, in which voice data is not input, is continued. According to JP 2006-71794 A, the duration according to a voice input of an address or a voice input of a facility name is set, and determination is made whether or not an input of voice data is completed based on the set duration.

SUMMARY

In JP 2006-71794 A, a category of a search item is set in advance, and the duration is set to a time according to the category. Then, the user speaks to input voice data, and the voice recognition device determines whether or not an input of voice data is completed. In JP 2006-71794 A, in a case where the user speaks without setting a category of a search item in advance, the duration may not be appropriately set, and determination regarding input completion of voice data may not be appropriately performed. In a technique relating to voice recognition, a feature of voice of the user is not taken into consideration, and it is desirable to improve flexibility to determination.

The disclosure has been accomplished in consideration of the above-described situation, and provides a voice recognition device, a voice recognition method, and a voice recognition program capable of improving flexibility to end-of-speech determination of a search word.

A first aspect of the disclosure relates to a voice recognition device. The voice recognition device includes a memory and a processor including hardware. The processor is configured to extract a feature of input voice data and set a duration of a silent state after transition of the voice data to the silent state based on the feature, the duration being used for determining that an input of the voice data is completed.

In the voice recognition device according to the first aspect of the disclosure, the processor may be configured to determine that the input of the voice data is completed in a case where a silent time elapsed after the transition of the input voice data to the silent state exceeds the duration.

With the voice recognition device, since determination is made that the speech of the user ends (the input of the voice data is completed) in a case where the silent time exceeds the duration set according to the feature of the voice data, the end of speech of the user can be determined at an appropriate timing.

In the voice recognition device according to the first aspect of the disclosure, the processor may be configured to determine whether the feature is an address, a facility name, or a telephone number from the voice data and set the duration according to the determined feature.

With the voice recognition device, since the duration is set according to a category input by voice, the duration according to the category is set, and the end of speech of the user can be determined at an appropriate timing.

In the voice recognition device according to the first aspect of the disclosure, the processor may be configured to calculate the number of errors of voice recognition in the voice data and set the duration according to the number of errors.

With the voice recognition device, since the duration is set according to the number of errors of voice recognition, adjustment can be performed such that the end of speech is determined at an appropriate timing in a case where a recognition error occurs.

In the voice recognition device according to the first aspect of the disclosure, the processor may be configured to acquire the feature of the voice data from information of a user who uses the voice recognition device and set the duration according to the acquired feature of the voice data.

With the voice recognition device, since the duration can be set according to an individual, the end of speech of the user can be determined at an appropriate timing according to a characteristic of the individual user who performs a voice input.

In the voice recognition device according to the first aspect of the disclosure, the processor may be configured to determine an age of a user and set the duration according to the determined age.

With the voice recognition device, since the duration is set according to the age of the user who speaks, the end of speech of the user can be determined at an appropriate timing.

In the voice recognition device according to the first aspect of the disclosure, the processor may be configured to calculate a speech speed from the voice data and set the duration according to the calculated speech speed.

With the voice recognition device, since the duration is set according to the speech speed, the end of speech can be determined at a timing suitable for an individual who performs a voice input. In addition, since the end of speech is determined at an appropriate timing according to a speech situation, the stress of the user can be reduced.

A second aspect of the disclosure relates to a voice recognition method that recognizes voice input from the outside. The voice recognition method includes extracting a feature of input voice data, and setting a duration of a silent state after transition of the voice data to the silent state based on the feature, the duration being used for determining that an input of the voice data is completed.

A third aspect of the disclosure relates to a voice recognition program that causes a voice recognition device configured to recognize voice input from the outside to execute extracting a feature of input voice data, and setting a duration of a silent state after transition of the voice data to the silent state based on the feature, the duration being used for determining that an input of the voice data is completed.

With the voice recognition device, the voice recognition method, and the voice recognition program according to the aspects of the disclosure, since the duration is set according to the feature of the voice data, an effect capable of improving flexibility to end-of-speech determination of a search word is obtained.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
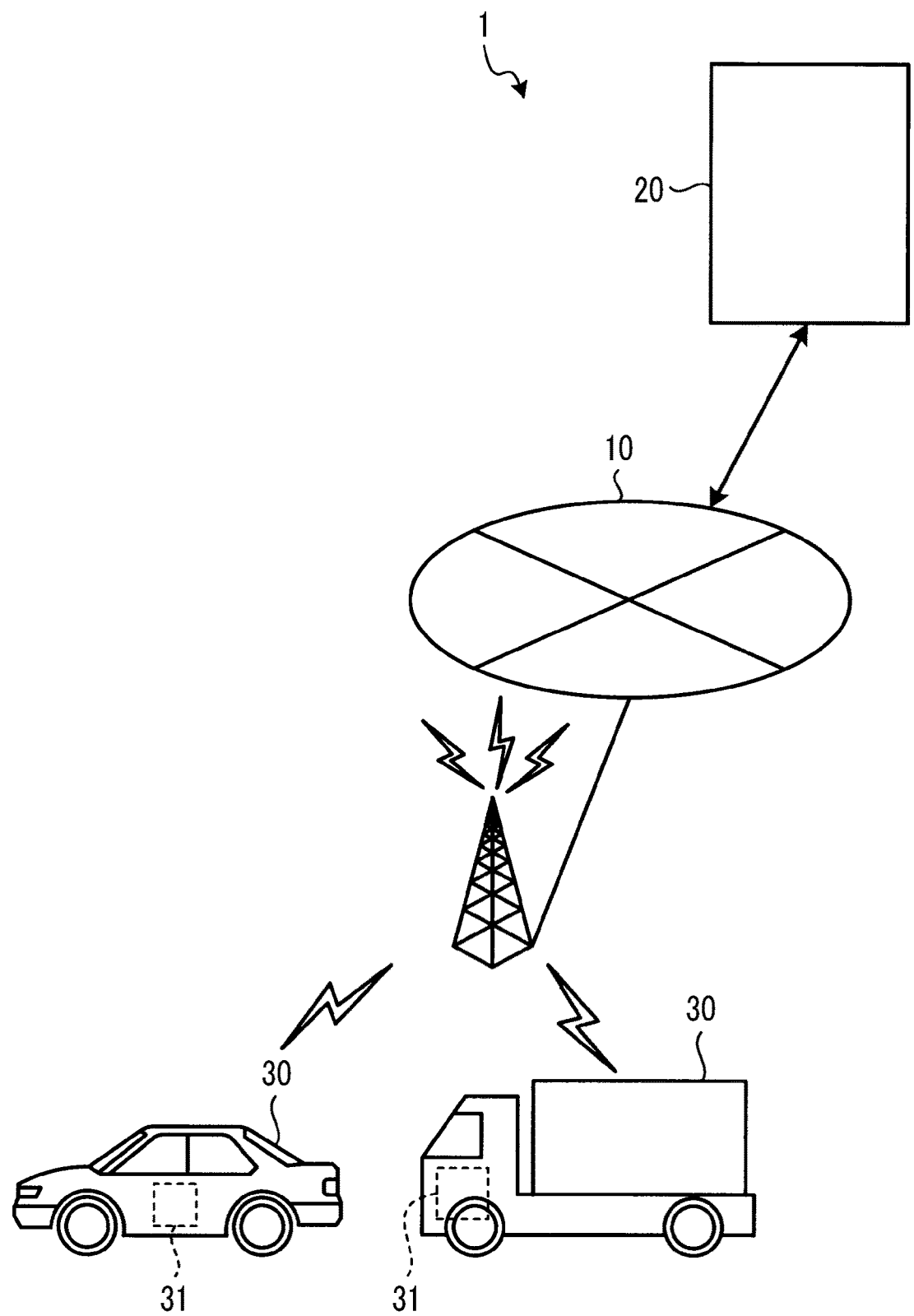
FIG. 1 is a schematic view showing a voice recognition system for a vehicle including a voice recognition device according to an embodiment.

Hereinafter, an embodiment will be described referring to the drawings. It should be noted that, throughout all of the drawings, the same reference numerals are assigned to the same or corresponding parts. Furthermore, the disclosure is not limited by the embodiment described below.

Embodiment

Figure 2:
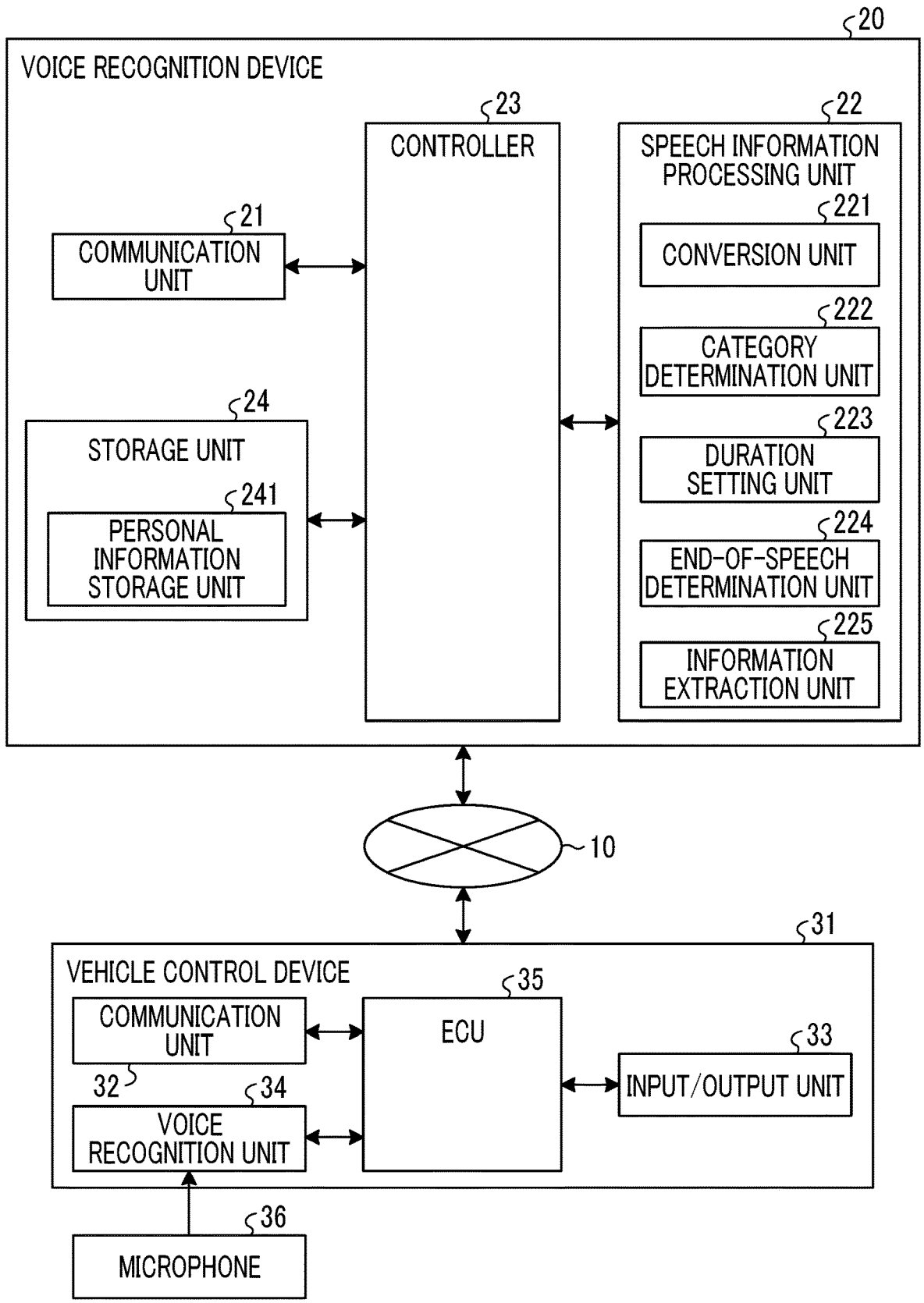
FIG. 2 is a block diagram showing the configuration of the voice recognition device and a vehicle control device in the voice recognition system for a vehicle according to the embodiment.

First, a voice recognition system for a vehicle including a voice recognition device according to the embodiment will be described. FIG. 1 is a schematic view showing the voice recognition system for a vehicle according to the embodiment. FIG. 2 is a block diagram showing the configuration of a voice recognition device and a vehicle control device in the voice recognition system for a vehicle according to the embodiment.

As shown in FIG. 1, a voice recognition system 1 for a vehicle according to the embodiment includes a voice recognition device 20 and vehicles 30. In the voice recognition system 1 for a vehicle according to the embodiment, the voice recognition device 20 and each vehicle 30 are connected to be communicable with each other through a network 10. Specifically, the voice recognition device 20 and a vehicle control device 31 in the vehicle 30 are connected to be communicable through the network 10. The network 10 is constituted of an Internet network, a mobile phone network through which the voice recognition device 20 and the vehicle 30 are communicable with each other.

The voice recognition device 20 receives voice data input by voice from each vehicle 30 and transmits information processed based on received voice data. The voice recognition device 20 may execute driving assistance processing, such as safety confirmation processing, in the vehicle 30.

As shown in FIG. 2, the voice recognition device 20 includes a communication unit 21, a speech information processing unit 22, a controller 23, and a storage unit 24. The voice recognition device 20 is constituted using one or a plurality of computers having a central processing unit (CPU), a field programmable gate array (FPGA), a read only memory (ROM), a random access memory (RAM), and the like.

The communication unit 21 is connected to the network 10 to perform communication with the vehicle 30. The communication unit 21 receives voice data from the vehicle 30 or transmits a search result relating to a voice-recognized search word to the vehicle 30 as a transmission target. The communication unit 21 may receive information relating to the vehicle 30 and may transmit information for assisting the driving of the vehicle 30.

The speech information processing unit 22 executes determination of a search word and search processing corresponding to the search word in a case where voice data is received from the vehicle 30. The speech information processing unit 22 includes a conversion unit 221, a category determination unit 222, a duration setting unit 223, an end-of-speech determination unit 224, and an information extraction unit 225. Hereinafter, "speech" refers to that a user sounds out one or a plurality of words, and "end of speech" refers to that the user ends speech. For this reason, during "speech", voice data is sequentially input from the vehicle control device 31. The "end of speech" means that an input of voice data by the speech of the user is completed.

The conversion unit 221 converts voice data received from the vehicle control device 31 to a word string. The speech information processing unit 22 collates phonemes (for example, "a", "i", and the like) registered in advance in the storage unit 24 with received voice data, thereby converting each phoneme included in voice data to a character. Then, the conversion unit 221 collates a set of converted characters with words registered in advance in the storage unit 24, thereby performing processing for converting voice data to the word string. The conversion unit 221 applies grammar registered in advance to the word string, thereby outputting a word, such as a particle, included in the word string to the category determination unit 222 in distinction from a word to be a search keyword.

Here, the words and the content of grammar stored in the storage unit 24 can be updated using an external database, and the updated content is also reflected in the storage unit 24. For example, in a case where a new store or facility is added to the database, the added store name or facility name is added as a new word to the storage unit 24.

The category determination unit 222 determines a category (speech domain) of the word string acquired from the conversion unit 221. As the category, an address, a facility, and a telephone number are exemplified. The category determination unit 222 selects one of the address, the facility, and the telephone number as the category of the word string based on the word string. In the embodiment, the category determined by the category determination unit 222 corresponds to a feature of voice data.

The duration setting unit 223 sets a duration for determining that the input of voice data is completed. In the embodiment, the duration setting unit 223 sets the duration according to the category determined by the category determination unit 222. The duration is a period during which an input of new voice data is received from a time when previous voice data is received. For example, in a case where "address" is selected as the category, the duration setting unit 223 sets the duration to a time longer than in a case where "facility" is selected.

The end-of-speech determination unit 224 determines whether or not the speech of the user ends (end of speech) based on the duration set by the duration setting unit 223. Specifically, the end-of-speech determination unit 224 determines whether or not a silent time for which a state determined to be silent with no input of voice data from a time when previous voice data is input is maintained exceeds the set duration, thereby determining whether or not the input of voice data by the speech of the user is completed.

Figure 3:
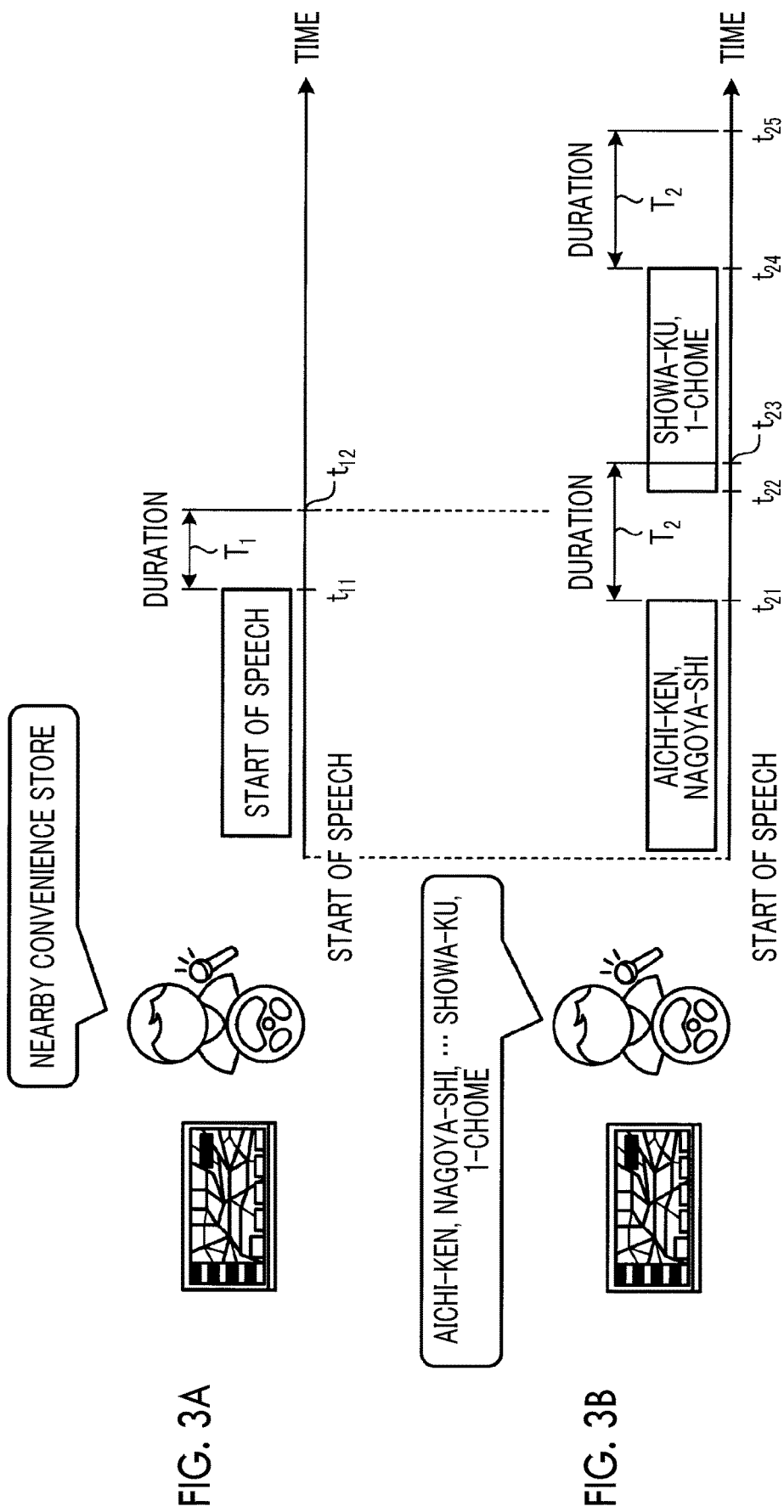
FIG. 3A is a diagram showing an example of a speech content in the voice recognition system for a vehicle including the voice recognition device according to the embodiment.
FIG. 3B is a diagram showing an example of a speech content in the voice recognition system for a vehicle including the voice recognition device according to the embodiment.

FIG. 3A and FIG. 3B are diagrams showing an example of a speech content in the voice recognition system for a vehicle including the voice recognition device according to the embodiment. For example, in a case where the user inputs a facility name ("nearby convenience store") by voice, as shown FIG. 3A, "facility" is selected as the category in the category determination unit 222, and the duration is set to $T_1$ by the duration setting unit 223. In contrast, in a case where the user inputs an address (". . . , 1-chome, Showa-ku, . . . , Nagoya-shi, Aichi-ken") by voice, as shown in FIG. 3B, "address" is selected as the category in the category determination unit 222, and the duration is set to $T_2$ ($>T_1$) by the duration setting unit 223.

Specifically, as shown in FIG. 3A, in a case where the input of voice data of the word string of "nearby convenience store" is completed from the start of speech, and new voice data is not input even though the duration T1 has elapsed from time t11 when transition is made to a silent state with no input of voice data, the end-of-speech determination unit 224 determines that the input of voice data is completed (end of speech) regarding a present voice input. In contrast, as shown in FIG. 3B, in a case where the input of voice data of the word string of "Nagoya-shi, Aichi-ken" is completed from the start of speech, and new voice data is input within a duration before the duration T2 elapses from time t21 when transition is made to the silent state with no input of voice data, input processing of the word string is continued. For example, the duration T1 has elapsed from time t21 and voice is input at time t22 within the duration T2 (a period from time t21 to time t23), the input processing of the word string is continued. In addition, in a case where new voice data is not input within the duration T2 (until time t25) from time t24 when the recognition of the subsequent word string of "1-chome, Showa-ku" is completed, the end-of-speech determination unit 224 determines that the input of voice data is completed (end of speech) regarding a present voice input.

The information extraction unit 225 extracts corresponding information regarding the word string converted by the conversion unit 221. For example, in a case where the user speaks the address, the information extraction unit 225 extracts a position corresponding to the address and surrounding map information from map information stored in the storage unit 24. In this case, the category determination unit 222 selects "address" as the category, and the duration according to the voice input of the address is set by the duration setting unit 223. The information extraction unit 225 extracts information based on the input word string without waiting for determination of the end of speech. In this case, a plurality of kinds of information may be extracted from the word string. In a case where information is extracted by the information extraction unit 225, the voice recognition device 20 outputs the extracted information to the vehicle 30.

The controller 23 integrally controls the operation of the units of the voice recognition device 20.

The storage unit 24 has a storage medium, such as a hard disk or a semiconductor memory, and a drive device of the storage medium, and stores various programs and various kinds of data in a writable and readable manner. In the storage unit 24, information to be searched is stored to voice-recognized data. As information to be searched, for example, map information, facility information, telephone numbers associated with the map information or the facility information, and the like are exemplified.

The storage unit 24 has a personal information storage unit 241. In the personal information storage unit 241, personal information of a user, such as an age, a speech speed, a face image, voice information, and a weight of the user, registered in association with the vehicle 30 is stored. The speech speed is, for example, a speed that is calculated from a silent time between the words of the word string converted based on voice data. The speech speed may be a relative value of a speed characterized by each of different users.

The vehicle control device 31 provided in the vehicle 30 is connected to be communicable with the voice recognition device 20 through the network 10, and electrically controls the units of the vehicle 30. The vehicle control device 31 includes a communication unit 32, an input/output unit 33, a voice recognition unit 34, and an electronic control unit (ECU) 35. The vehicle 30 is provided with a microphone 36 that collects voice. Voice data collected by the microphone 36 is output to the voice recognition unit 34.

The communication unit 32 performs communication with the voice recognition device 20 by wireless communication through the network 10.

The input/output unit 33 is constituted of a touch panel display, a speaker, or the like. The input/output unit 33 is configured to display a character, a figure, or the like on a screen of the touch panel display or output sound from a speaker to input and output predetermined information, such as information relating to driving assistance, under the control of the ECU 35. The input/output unit 33 is configured to input predetermined information to the ECU 35 in a case where the user or the like operates the touch panel display. The input/output unit 33 constitutes, for example, a part of a car navigation system.

The voice recognition unit 34 generates voice data from voice input through the microphone 36 and outputs voice data to the ECU 35. In a case where voice data is input, the ECU 35 transmits voice data to the voice recognition device 20 through the network 10. In the voice recognition unit 34, voice data may be converted to the above-described word string.

The ECU 35 is constituted of an information processing device, such as a microcomputer having a CPU, an FPGA, a ROM, a RAM, and the like. The ECU 35 integrally controls the electrical operations of the units of the vehicle 30. The ECU 35 is configured to perform computation using input data or data stored in advance and a program, and output a computation result as a control command signal. For example, in a case where information is received from the voice recognition device 20, the ECU 35 makes the input/output unit 33 display information. Specifically, an image according to information is displayed on a display screen of the car navigation system.

Though not shown, the vehicle control device 31 includes a storage medium, such as a hard disk or a semiconductor memory, and a drive device of the storage medium. In the storage unit, programs, such as an operating system (OS) needed in a case where the ECU 35 integrally controls the units of the vehicle 30 and various applications, are stored.

The vehicle 30 includes known equipment in the related art needed for traveling. Specifically, the vehicle 30 includes an engine. The engine may be configured to be driven by combustion of fuel to generate electric power using an electric motor. The generated electric power is charged to, for example, a chargeable battery. The vehicle 30 includes a global positioning system (GPS) unit (not shown) that receives electric waves from GPS satellites and detects a position of the vehicle 30. The detected position is output to the outside or is stored in the storage unit as positional information of the vehicle 30.

Figure 4:
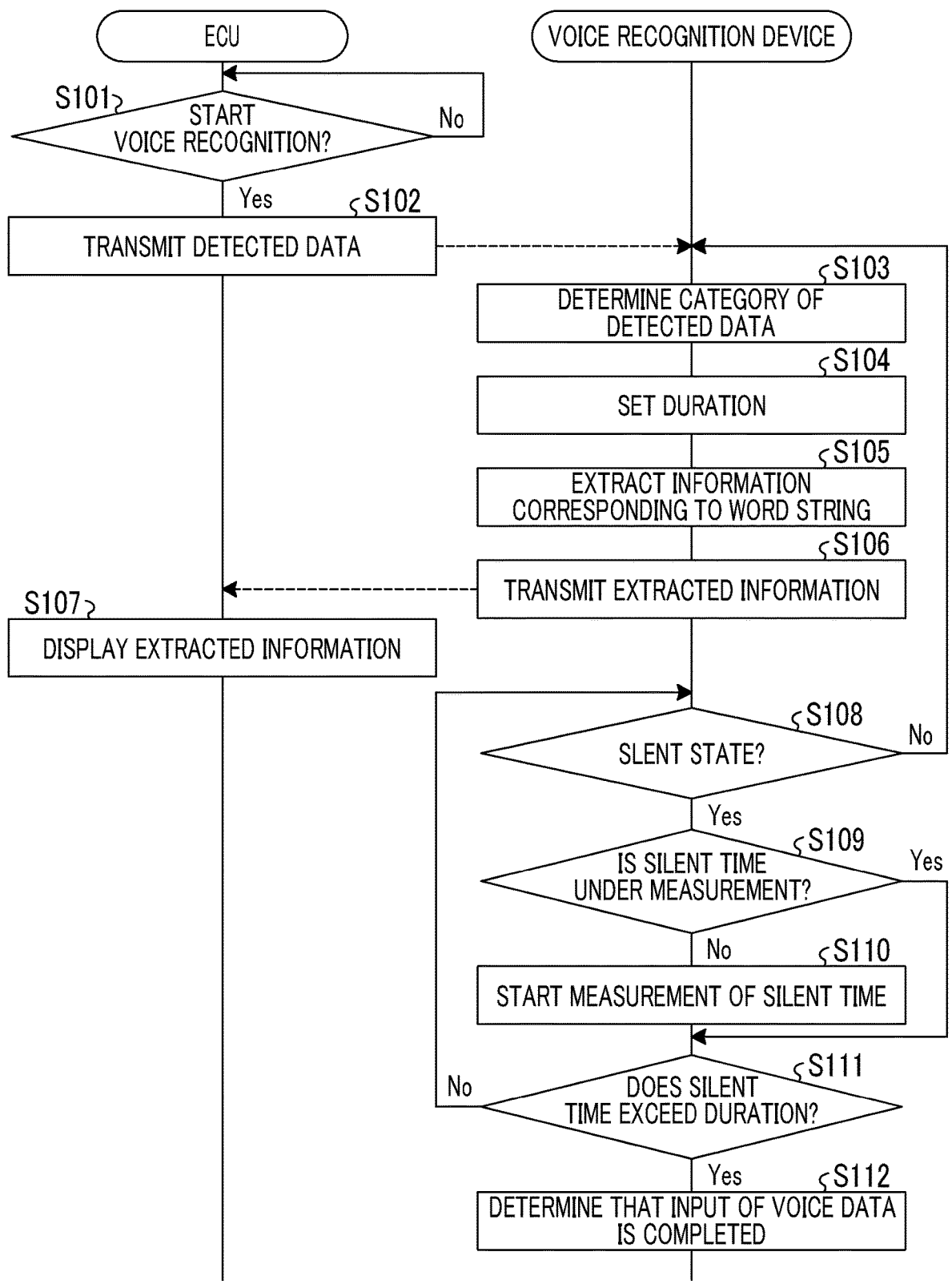
FIG. 4 is a diagram illustrating a flow of voice recognition processing that is executed by the voice recognition system for a vehicle according to the embodiment.

Subsequently, voice recognition processing that is executed by the voice recognition system 1 for a vehicle will be described referring to FIG. 4. FIG. 4 is a diagram illustrating a flow of the voice recognition processing that is executed by the voice recognition system for a vehicle according to the embodiment. The processing shown in FIG. 4 is started, for example, after the vehicle 30 is driven.

The ECU 35 determines whether or not to start voice recognition (Step S101). The ECU 35 determines whether or not the voice recognition unit 34 detects a voice input through the microphone 36, thereby determining the start of voice recognition. Here, in a case where the voice recognition unit 34 does not detect a voice input (Step S101: No), the ECU 35 repeatedly confirms the start of voice recognition. In contrast, in a case where the voice recognition unit 34 detects a voice input (Step S101: Yes), the ECU 35 starts the voice recognition and progresses to Step S102.

In Step S102, the voice recognition unit 34 generates voice data from the input voice and outputs voice data to the ECU 35. The ECU 35 transmits voice data to the voice recognition device 20 through the network 10.

In Step S103 subsequent to the Step S102, in the voice recognition device 20, the conversion unit 221 converts voice data to the word string, and the category determination unit 222 determines the category of the word string. The category determination unit 222 selects one of an address, a facility name, and a telephone number as the category.

The duration setting unit 223 sets the duration according to the category determined in Step S103 (Step S104). In a case where the duration is set, the controller 23 progresses to Step S105.

In Step S105, the information extraction unit 225 extracts information corresponding to the input word string. In a case where information corresponding to the word string is extracted, the extracted information is transmitted from the communication unit 21 to the vehicle 30 (Step S106). In the extracted information, a plurality of selection candidates may be included.

Thereafter, in the vehicle 30, the acquired extracted information is displayed (Step S107). Steps S103 and S104 and Steps S105 to S107 described above may be in a reverse order.

The end-of-speech determination unit 224 determines whether or not the silent state is brought (Step S108). Specifically, the end-of-speech determination unit 224 determines whether or not voice data is input from the vehicle control device 31 (Step S108). Here, in a case where the silent state is not brought, that is, in a case where new voice data is input (Step S108: No), the end-of-speech determination unit 224 returns to Step S103 and repeats the above-described processing. In contrast, in a case where the silent state, in which voice data is not input, is brought (Step S108: Yes), the ECU 35 progresses to Step S109.

In Step S109, the end-of-speech determination unit 224 determines whether or not the silent time is already under measurement. In a case where the silent time is under measurement (Step S109: Yes), the end-of-speech determination unit 224 progresses to Step S111. In contrast, in a case where the measurement of the silent time is not started (Step S109: No), the end-of-speech determination unit 224 progresses to Step S110.

In Step S110, the end-of-speech determination unit 224 starts the measurement of the silent time. The end-of-speech determination unit 224 measures, as the silent time, an elapsed time from a time when latest voice data is input.

In Step S111, the end-of-speech determination unit 224 determines whether or not the measured silent time exceeds the set duration. In a case where determination is made that the silent time does not exceed the duration (Step S111: No), the end-of-speech determination unit 224 returns to Step S108. In contrast, in a case where determination is made that the silent time exceeds the duration (Step S111: Yes), the end-of-speech determination unit 224 progresses to Step S112.

In Step S112, the end-of-speech determination unit 224 determines that the input of voice data is completed (the user ends speech (end of speech)).

The user confirms an extraction result displayed every time in the vehicle 30 and selects desired information or performs setting. For example, in a case where an address is searched, and in a case where an address to be a destination is displayed, the user sets the address as the destination. At this time, route search from a current place to the destination, or the like is performed. In a case where desired information is not displayed, and in a case where the user performs a voice input again, the above-described voice recognition processing is executed again in the voice recognition system 1 for a vehicle.

In the embodiment described above, the speech category is determined from input voice data, and the duration for determining that the input of voice data is completed is set according to the determined speech category. According to the embodiment, it is possible to appropriately determine the end of speech of the search word without setting a category of a search item in advance immediately before a voice input is performed without setting a category of a search item in advance.

In the above-described embodiment, although the speech category is determined and the duration is set based on the determined speech category, the setting of the duration is not limited to the speech category.

Modification Example 1

Next, Modification Example 1 of the embodiment will be described referring to FIG. 5. In a voice recognition system for a vehicle according to Modification Example 1, the end-of-speech determination unit 224 in the voice recognition device 20 described above is provided in the vehicle control device 31. Other configurations are the same as those of the voice recognition system 1 for a vehicle described above, and thus, description will not be repeated.

Figure 5:
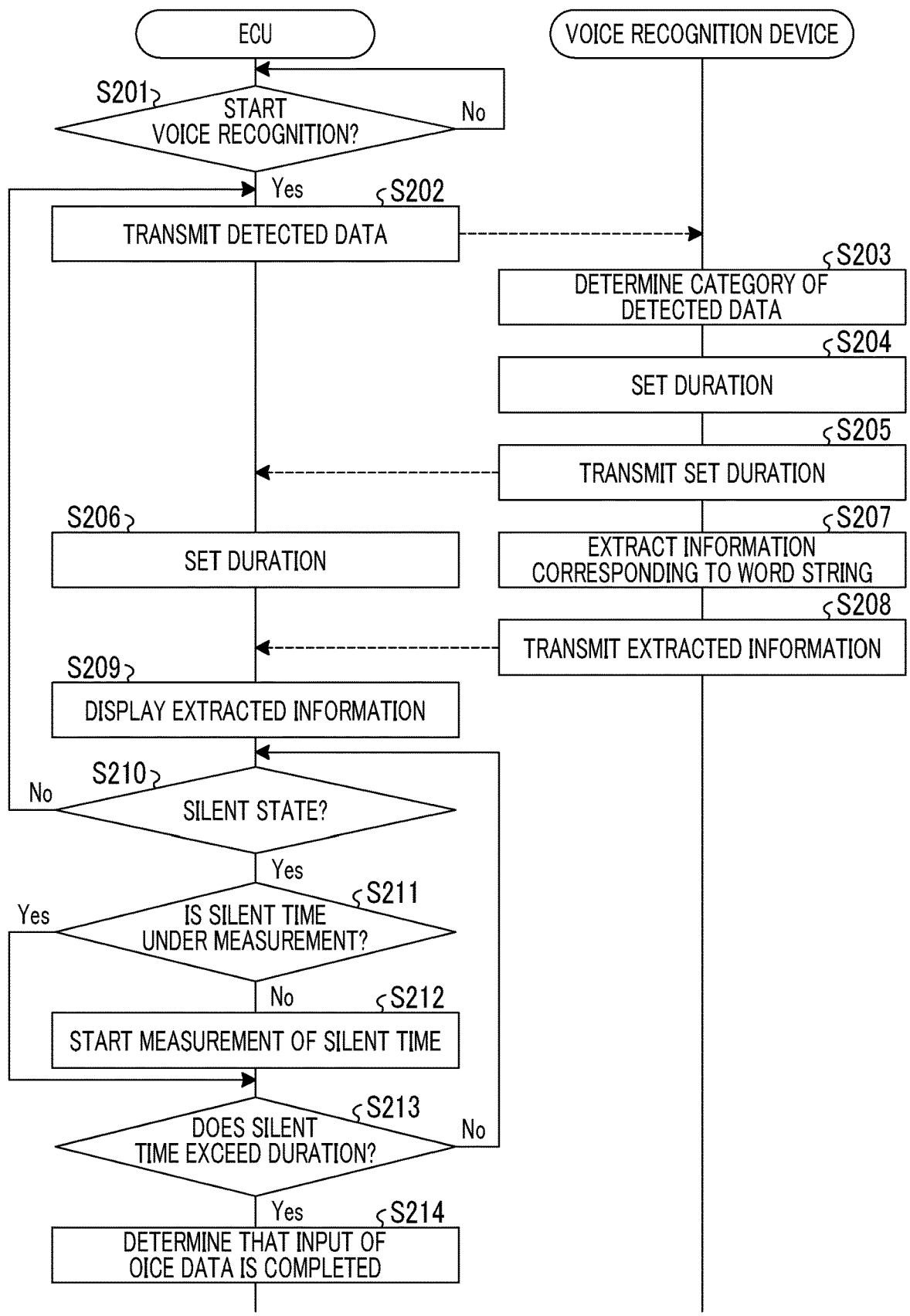
FIG. 5 is a diagram illustrating a flow of voice recognition processing that is executed by a voice recognition system for a vehicle according to Modification Example 1 of the embodiment.

FIG. 5 is a diagram illustrating a flow of voice recognition processing that is executed by the voice recognition system for a vehicle according to Modification Example 1 of the embodiment. The processing shown in FIG. 5 is started, for example, after the vehicle 30 is driven.

The ECU 35 determines whether or not to start voice recognition (Step S201). The ECU 35 determines whether or not the voice recognition unit 34 detects a voice input through the microphone 36, thereby determining the start of voice recognition. Here, in a case where the voice recognition unit 34 does not detect a voice input (Step S201: No), the ECU 35 repeatedly confirms the start of voice recognition. In contrast, in a case where the voice recognition unit 34 detects a voice input (Step S201: Yes), the ECU 35 starts the voice recognition and progresses to Step S202.

In Step S202, the voice recognition unit 34 generates voice data from the input voice and outputs voice data to the ECU 35. The ECU 35 transmits voice data to the voice recognition device 20 through the network 10.

In Step S203 subsequent to Step S202, in the voice recognition device 20, the conversion unit 221 converts voice data to the word string, and the category determination unit 222 determines the category of the word string. The category determination unit 222 selects one of an address, a facility name, and a telephone number as the category.

The duration setting unit 223 sets the duration according to the category determined in Step S203 (Step S204). In a case where the duration is set, the controller 23 transmits the set duration to the vehicle control device 31 (Step S205).

The controller 23 sets the duration according to the received duration (Step S206).

In the voice recognition device 20, the information extraction unit 225 extracts information corresponding to the input word string (Step S207). In a case where information corresponding to the word string is extracted, the extracted information is transmitted from the communication unit 21 to the vehicle 30 (Step S208). In the extracted information, a plurality of selection candidates may be included.

Thereafter, in the vehicle 30, the acquired extracted information is displayed (Step S209). Steps S203 to S206 and Steps S207 to S209 described above may be in a reverse order.

The end-of-speech determination unit 224 provided in the vehicle control device 31 determines whether or not the silent state is brought (Step S210). Specifically, the end-of-speech determination unit 224 determines whether or not voice data is input through the microphone 36. Here, in a case where voice data is input (Step S210: No), the end-of-speech determination unit 224 returns to Step S202 and repeats the above-described processing. In contrast, in a case where the silent state, in which voice data is not input, is brought (Step S210: Yes), the ECU 35 progresses to Step S211.

In Step S211, the end-of-speech determination unit 224 determines whether or not the silent time is already under measurement. In a case where the silent time is under measurement (Step S211: Yes), the end-of-speech determination unit 224 progresses to Step S213. In contrast, in a case where the measurement of the silent time is not started (Step S211: No), the end-of-speech determination unit 224 progresses to Step S212.

In Step S212, the end-of-speech determination unit 224 starts the measurement of the silent time. The end-of-speech determination unit 224 measures, as the silent time, an elapsed time from a time when latest voice data is input.

In Step S213, the end-of-speech determination unit 224 determines whether or not the measured silent time exceeds the set duration. In a case where determination is made that the silent time does not exceed the duration (Step S213: No), the end-of-speech determination unit 224 returns to Step S210. In contrast, in a case where determination is made that the silent time exceeds the duration (Step S213: Yes), the end-of-speech determination unit 224 progresses to Step S214.

In Step S214, the end-of-speech determination unit 224 determines that the input of voice data is completed (the user ends speech (end of speech)).

As in Modification Example 1 described above, in the vehicle control device 31, determination may be made that the end of speech is completed. Even in Modification Example 1, it is possible to appropriately determine the end of speech of the search word immediately before a voice input is performed without setting a category of a search item in advance.

Modification Example 2

Figure 6:
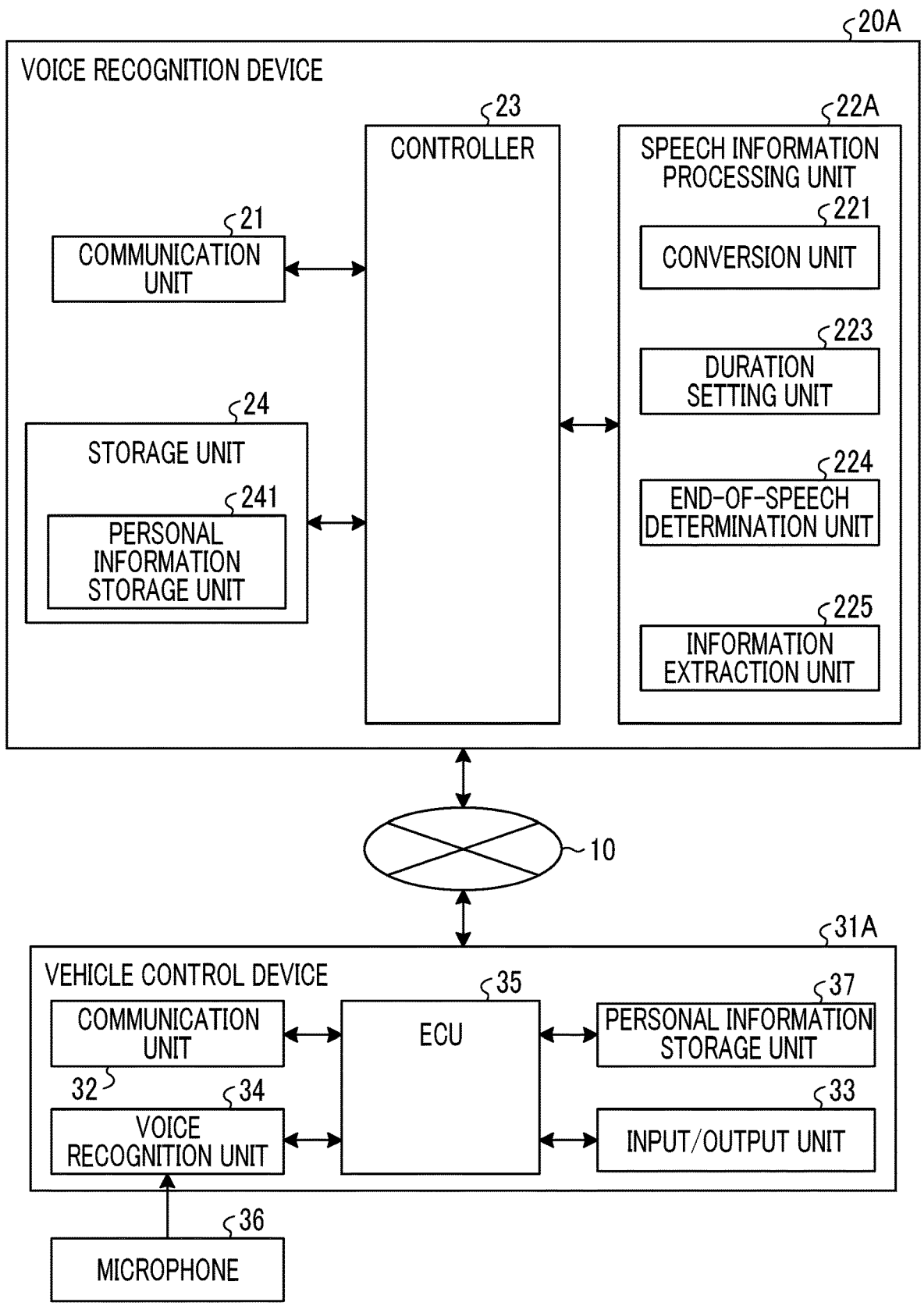
FIG. 6 is a block diagram showing the configuration of a voice recognition device and a vehicle control device in a voice recognition system for a vehicle according to Modification Example 2 of the embodiment.

FIG. 6 is a block diagram showing the configuration of a voice recognition device and a vehicle control device in a voice recognition system for a vehicle according to Modification Example 2 of the embodiment. The voice recognition system for a vehicle according to Modification Example 2 includes a voice recognition device 20A and a vehicle control device 31A instead of the voice recognition device 20 and the vehicle control device 31 described above.

The voice recognition device 20A includes a speech information processing unit 22A in addition to the communication unit 21, the controller 23, and the storage unit 24 described above. The communication unit 21, the controller 23, and the storage unit 24 have the same configuration as those in the above-described voice recognition system 1 for a vehicle, and thus, description will not be repeated.

The speech information processing unit 22A includes the conversion unit 221, the duration setting unit 223, the end-of-speech determination unit 224, and the information extraction unit 225. The speech information processing unit 22A does not have the category determination unit 222 in contrast to the above-described speech information processing unit 22.

The vehicle control device 31A includes a personal information storage unit 37 in addition to the communication unit 32, the input/output unit 33, the voice recognition unit 34, and the ECU 35 described above. The vehicle 30 is provided with the microphone 36 that collects voice. The communication unit 32, the input/output unit 33, the voice recognition unit 34, the ECU 35, and the microphone 36 provided in the vehicle have the same configuration as those in the above-described voice recognition system 1 for a vehicle, and thus, description will not be repeated.

The personal information storage unit 37 stores personal information of a user who uses the vehicle 30. In the personal information storage unit 37, an age, a speech speed, and the like are stored in association with a personal name. The ECU 35 extracts information with reference to the personal information storage unit 37 and outputs the extracted information to the voice recognition device 20A regarding an individual selected through the input/output unit 33.

Figure 7:
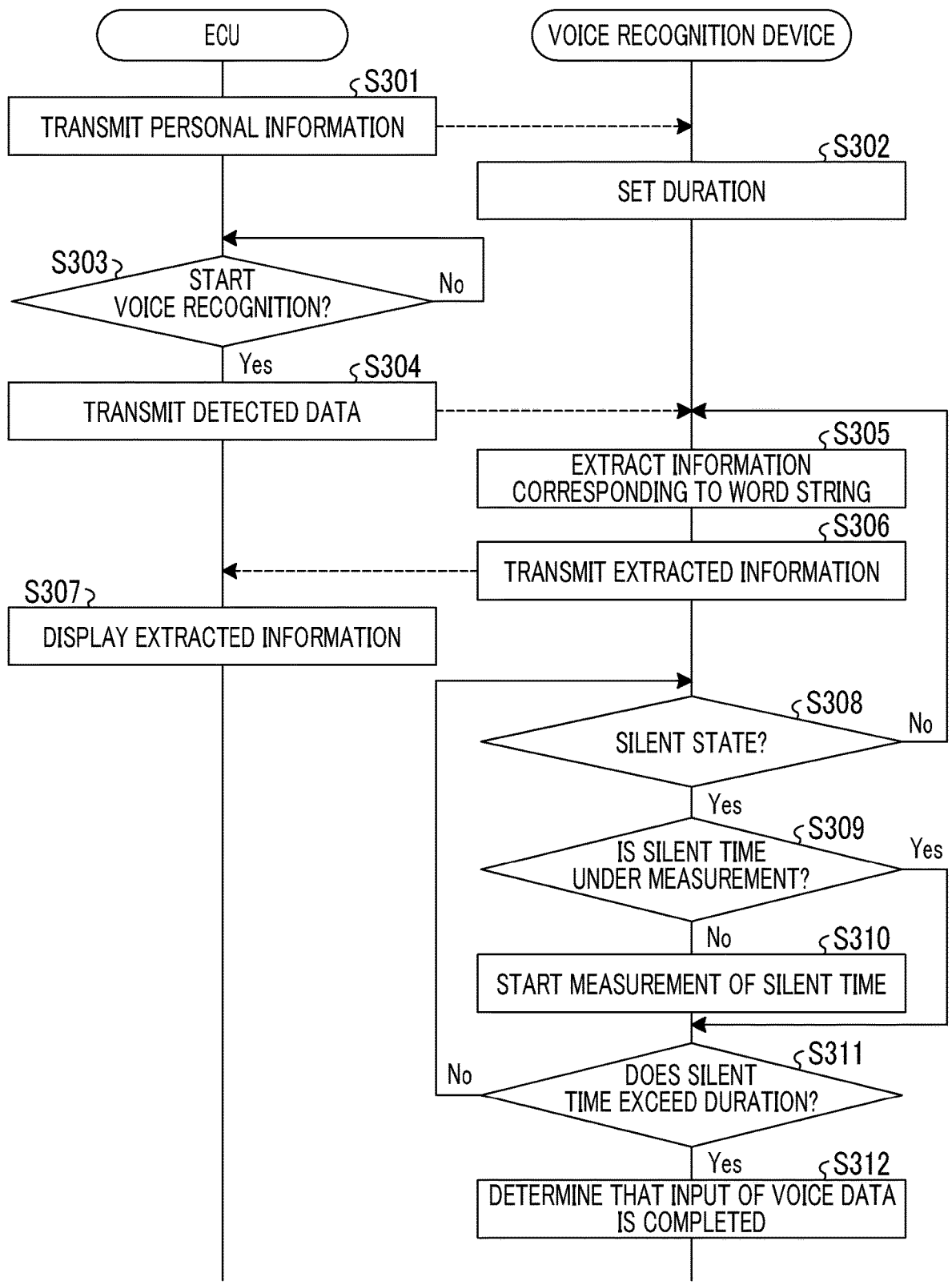
FIG. 7 is a diagram illustrating a flow of voice recognition processing that is executed by the voice recognition system for a vehicle according to Modification Example 2 of the embodiment.

In Modification Example 2, the duration is set based on personal information set in advance. FIG. 7 is a diagram illustrating a flow of voice recognition processing that is executed by a voice recognition system for a vehicle according to Modification Example 2 of the embodiment. The processing shown in FIG. 7 is started, for example, after the vehicle is driven.

First, when the vehicle is driven, the ECU 35 transmits personal information of the user of the vehicle to the voice recognition device 20A with reference to the personal information storage unit 37 (Step S301). The personal information to be transmitted is information including an age of a user who boards on the vehicle, uses a voice input, and is selected through the input/output unit 33. In Modification Example 2, the age of the user corresponds to the feature of voice data.

In a case where the voice recognition device 20A acquires the personal information from the vehicle control device 31A, the duration setting unit 223 sets the duration based on the personal information (Step S302). In Modification Example 2, the duration setting unit 223 extracts the age from the personal information and sets the duration according to the age. At this time, for example, when the age of the individual is higher, the duration is set to be longer.

The ECU 35 determines whether or not to start voice recognition (Step S303). The ECU 35 determines whether or not the voice recognition unit 34 detects a voice input through the microphone 36, thereby determining the start of voice recognition. Here, in a case where the voice recognition unit 34 does not detect a voice input (Step S303: No), the ECU 35 repeatedly confirms the start of voice recognition. In contrast, in a case where the voice recognition unit 34 detects a voice input (Step S303: Yes), the ECU 35 starts the voice recognition and progresses to Step S304.

In Step S304, the voice recognition unit 34 generates voice data from the input voice and outputs voice data to the ECU 35. The ECU 35 transmits voice data to the voice recognition device 20A through the network 10.

In Step S305 subsequent to Step S304, in the voice recognition device 20, the conversion unit 221 converts voice data to the word string, and the information extraction unit 225 extracts information corresponding to the input word string. In a case where information corresponding to the word string is extracted, the extracted information is transmitted from the communication unit 21 to the vehicle 30 (Step S306). In the extracted information, a plurality of selection candidates may be included.

Thereafter, in the vehicle 30, the acquired extracted information is displayed (Step S307).

The end-of-speech determination unit 224 determines whether or not the silent state is brought (Step S308). Specifically, the end-of-speech determination unit 224 determines whether or not voice data is input from the vehicle control device 31 (Step S308). Here, in a case where voice data is input (Step S308: No), the end-of-speech determination unit 224 returns to Step S305 and repeats the above-described processing. In contrast, in a case where the silent state, in which voice data is not input, is brought (Step S308: Yes), the ECU 35 progresses to Step S309.

In Step S309, the end-of-speech determination unit 224 determines whether or not the silent time is already under measurement. In a case where the silent time is under measurement (Step S309: Yes), the end-of-speech determination unit 224 progresses to Step S311. In contrast, in a case where the measurement of the silent time is not started (Step S309: No), the end-of-speech determination unit 224 progresses to Step S310.

In Step S310, the end-of-speech determination unit 224 starts the measurement of the silent time. The end-of-speech determination unit 224 measures, as the silent time, an elapsed time from a time when latest voice data is input.

In Step S311, the end-of-speech determination unit 224 determines whether or not the measured silent time exceeds the set duration. In a case where determination is made that the silent time does not exceed the duration (Step S311: No), the end-of-speech determination unit 224 returns to Step S308. In contrast, in a case where determination is made that the silent time exceeds the duration (Step S311: Yes), the end-of-speech determination unit 224 progresses to Step S312.

In Step S312, the end-of-speech determination unit 224 determines that the input of voice data is completed (the user ends speech (end of speech)).

In Modification Example 2 described above, the duration is set from the input personal information. According to Modification Example 2, when a voice input is performed, since the duration is set from the personal information, it is possible to appropriately determine the end of speech of the search word without setting a category of a search item in advance. In this way, the end of speech is determined according to the personal information, whereby it is possible to improve flexibility to end-of-speech determination of the search word.

In Modification Example 2 described above, for example, face information of an individual who boards the vehicle may be acquired and the individual may be specified through identification processing based on the face image or the individual may be specified by voice (frequency or the like). The individual is determined by voice, whereby it is possible to set the duration according to a user who speaks even in a case where a plurality of people boards on the vehicle 30.

Modification Example 3

Figure 8:
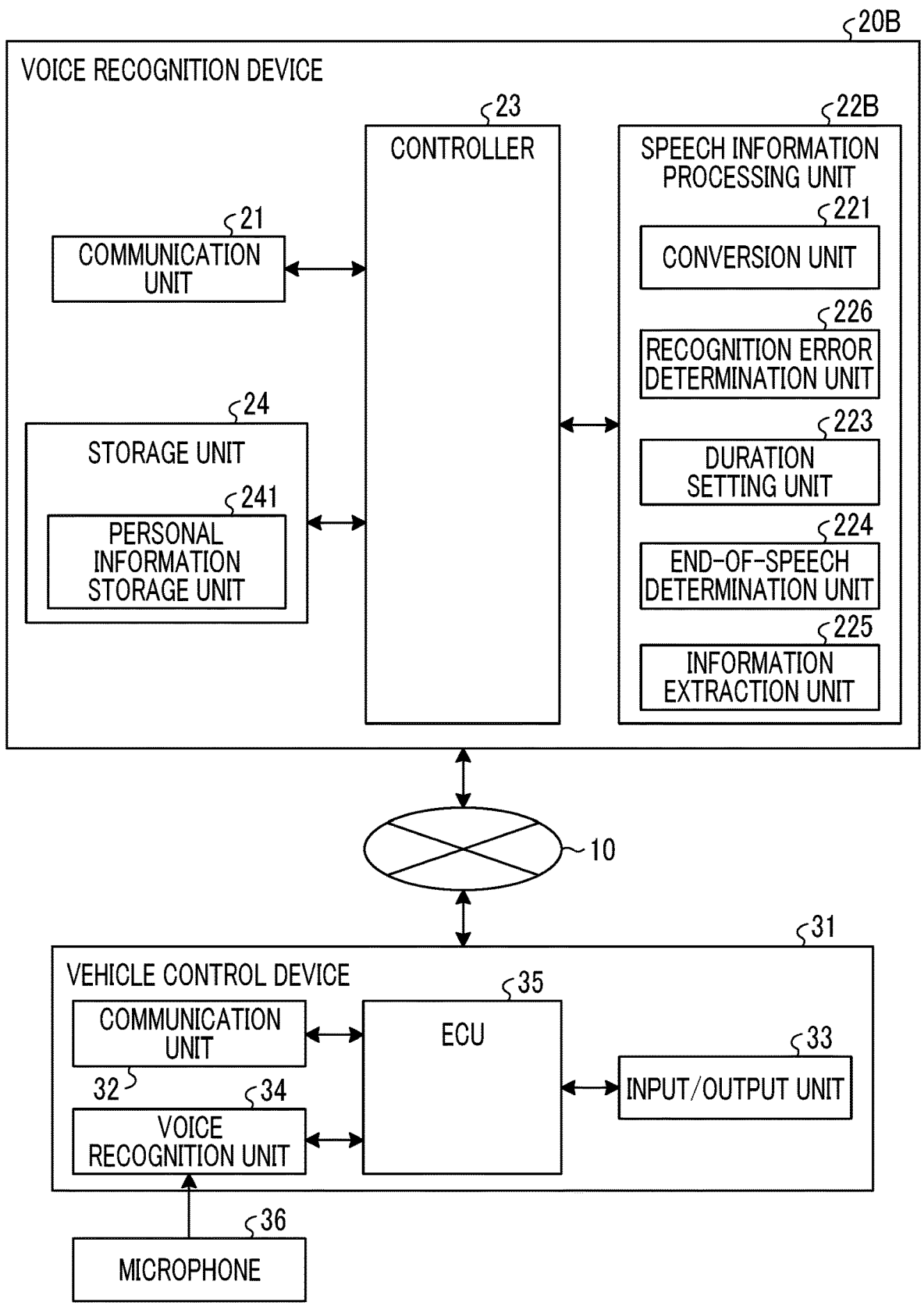
FIG. 8 is a block diagram showing the configuration of a voice recognition device and a vehicle control device in a voice recognition system for a vehicle according to Modification Example 3 of the embodiment.

FIG. 8 is a block diagram showing the configuration of a voice recognition device and a vehicle control device in a voice recognition system according to Modification Example 3 of the embodiment. The voice recognition system for a vehicle according to Modification Example 3 includes a voice recognition device 20B instead of the above-described voice recognition device 20. The configurations other than the voice recognition device 20B are the same as those in the above-described voice recognition system 1 for a vehicle, and thus, description will not be repeated.

The voice recognition device 20B includes a speech information processing unit 22B in addition to the communication unit 21, the controller 23, and the storage unit 24 described above. The communication unit 21, the controller 23, and the storage unit 24 have the same configuration as those in the above-described voice recognition system 1 for a vehicle, and thus, description will not be repeated.

The speech information processing unit 22B includes the conversion unit 221, a recognition error determination unit 226, the duration setting unit 223, the end-of-speech determination unit 224, and the information extraction unit 225. The speech information processing unit 22B has the recognition error determination unit 226 instead of the category determination unit 222 in contrast to the above-described speech information processing unit 22.

The recognition error determination unit 226 detects a context of a speech content (word or word string) to determine whether or not a recognition error occurs in the voice recognition processing. The recognition error determination unit 226 determines that a recognition error occurs, for example, in a case where the speech category, the speech content, or the like is changed in the middle, in a case where a voice input is newly performed without setting after the speech content is established, or in a case where processing ends in a state in which several setting candidates as a search result are present. Here, the recognition error determination unit 226 determines that the speech content is changed in a case where determination is made that the speech content has no connection, for example, the speech content is changed from an address to a facility name. In a case where determination is made that a recognition error occurs, the controller 23 increases the number of recognition errors of the user stored in the personal information storage unit 241 by one. In Modification Example 3, the number of recognition errors corresponds to a feature of voice data.

Figure 9:
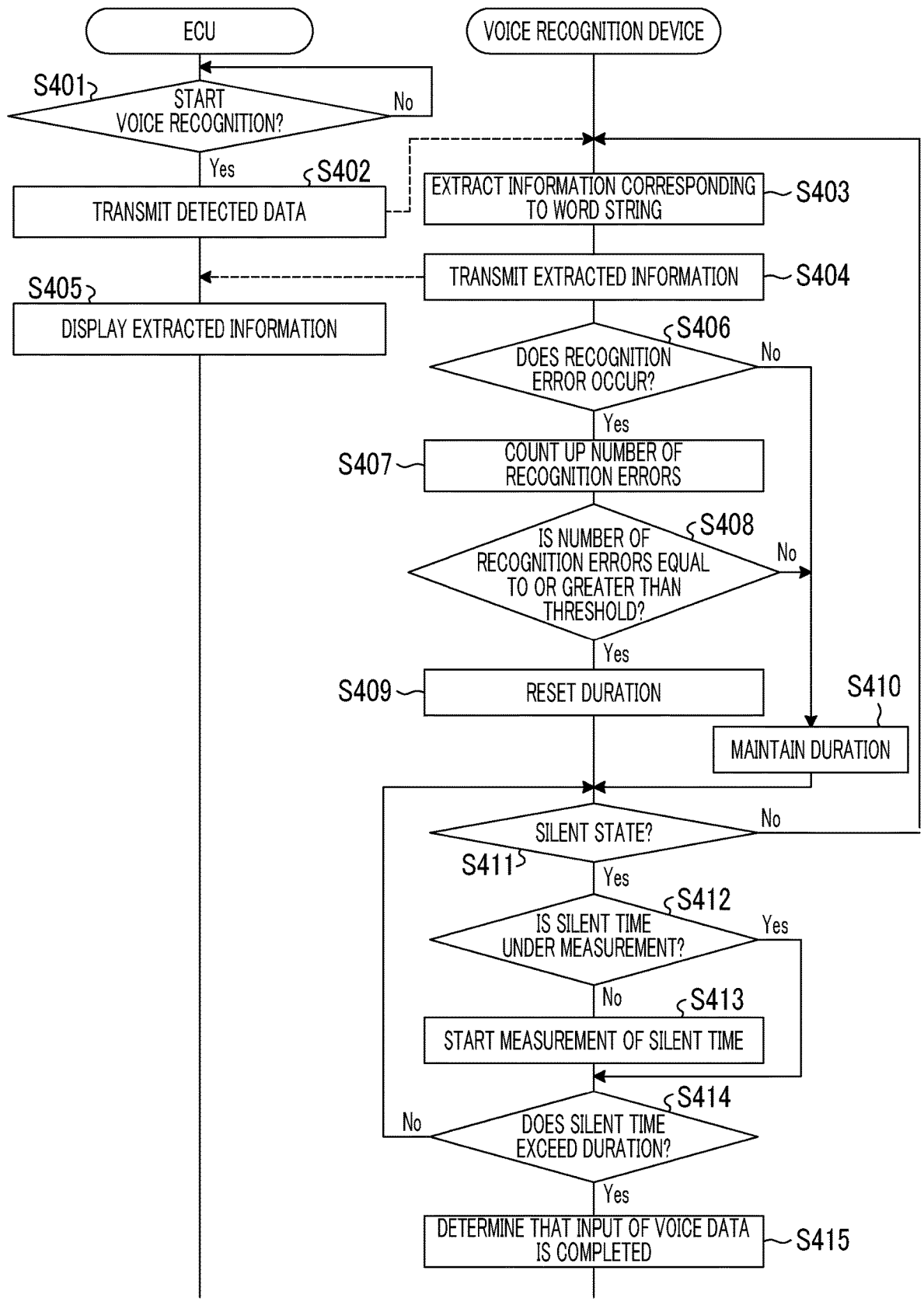
FIG. 9 is a diagram illustrating a flow of voice recognition processing that is executed by the voice recognition system for a vehicle according to Modification Example 3 of the embodiment.

In Modification Example 3, the duration is set based on personal information set in advance. FIG. 9 is a diagram illustrating a flow of voice recognition processing that is executed by the voice recognition system for a vehicle according to Modification Example 3 of the embodiment. In the processing shown in FIG. 9, a basic duration is set in advance.

The ECU 35 determines whether or not to start voice recognition (Step S401). The ECU 35 determines whether or not the voice recognition unit 34 detects a voice input through the microphone 36, thereby determining the start of voice recognition. Here, in a case where the voice recognition unit 34 does not detect a voice input (Step S401: No), the ECU 35 repeatedly confirms the start of voice recognition. In contrast, in a case where the voice recognition unit 34 detects a voice input (Step S401: Yes), the ECU 35 starts the voice recognition and progresses to Step S402.

In Step S402, the voice recognition unit 34 generates voice data from the input voice and outputs voice data to the ECU 35. The ECU 35 transmits voice data to the voice recognition device 20B through the network 10.

In Step S403 subsequent to Step S402, in the voice recognition device 20B, the conversion unit 221 converts voice data to the word string, and the information extraction unit 225 extracts information corresponding to the input word string. In a case where information corresponding to the word string is extracted, the extracted information is transmitted from the communication unit 21 to the vehicle 30 (Step S404). In the extracted information, a plurality of selection candidates may be included.

Thereafter, in the vehicle 30, the acquired extracted information is displayed (Step S405).

In the voice recognition device 20B, determination processing of a recognition error is executed (Step S406). The recognition error determination unit 226 compares a speech content (word or word string) spoken by the user previously and a present speech content (word or word string) based on voice data to determine whether or not a recognition error occurs. Here, in a case where determination is made that a recognition error occurs in the speech content (Step S406: Yes), the recognition error determination unit 226 progresses to Step S407. In contrast, in a case where determination is made that a recognition error does not occur in the speech content (Step S406: No), the recognition error determination unit 226 progresses to Step S410.

In Step S407, the controller 23 counts up the number of recognition errors. With this, the number of recognition errors associated with the user increases by one. At this time, the controller 23 may make the storage unit 24 store the number of recognition errors.

Thereafter, the controller 23 determines whether or not the number of recognition errors after count-up is equal to or greater than a threshold (Step S408). In a case where determination is made that the number of recognition errors is equal to or greater than the threshold (Step S408: Yes), the controller 23 progresses to Step S409. In contrast, in a case where determination is made that the number of recognition errors is less than the threshold (Step S408: No), the controller 23 progresses Step S410. Here, the threshold is set in advance and is set according to the number of recognition errors in which determination is made that the duration should be extended.

In Step S409, the duration setting unit 223 resets the duration. At this time, the duration setting unit 223 performs setting such that the duration becomes long.

In Step S410, the duration setting unit 223 maintains the setting of the duration currently set.

After the setting of the duration in Step S409 or S410, the end-of-speech determination unit 224 determines whether or not the silent state is brought (Step S411). Specifically, the end-of-speech determination unit 224 determines whether or not voice data is input from the vehicle control device 31 (Step S411). Here, in a case where voice data is input (Step S411: No), the end-of-speech determination unit 224 returns to Step S403 and repeats the above-described processing. In contrast, in a case where the silent state, in which voice data is not input, is brought (Step S411: Yes), the ECU 35 progresses to Step S412.

In Step S412, the end-of-speech determination unit 224 determines whether or not the silent time is already under measurement. In a case where the silent time is under measurement (Step S412: Yes), the end-of-speech determination unit 224 progresses to Step S414. In contrast, in a case where the measurement of the silent time is not started (Step S412: No), the end-of-speech determination unit 224 progresses to Step S403.

In Step S413, the end-of-speech determination unit 224 starts the measurement of the silent time. The end-of-speech determination unit 224 measures, as the silent time, an elapsed time from a time when latest voice data is input.

In Step S414, the end-of-speech determination unit 224 determines whether or not the measured silent time exceeds the set duration. In a case where determination is made that the silent time does not exceed the duration (Step S414: No), the end-of-speech determination unit 224 returns to Step S411. In contrast, in a case where determination is made that the silent time exceeds the duration (Step S414: Yes), the end-of-speech determination unit 224 progresses to Step S415.

In Step S415, the end-of-speech determination unit 224 determines that the input of voice data is completed (the user ends speech (end of speech)).

In Modification Example 3 described above, the duration is set from the number of recognition errors of voice recognition. According to Modification Example 3, when a voice input is performed, since the duration is reset in a case where a recognition error is continued, it is possible to appropriately determine the end of speech of the search word without setting a category of a search item in advance.

In Modification Example 3, a count value of a recognition error may be given for each individual by associating the number of recognition errors with personal information every time, after an individual who boards the vehicle 30 is specified, the count value of the recognition error may be extracted, and the duration may be set according to the count value.

The disclosure is not limited to the embodiment and the modification examples described above, and for example, when the speech speed of the user is higher, the duration may be shorter. In this case, for example, in Steps S103 and S104 of FIG. 4, the duration setting unit 223 detects, for example, the silent time between the words of the word string or detects the number of words and a time needed for the speech based on voice data, calculates the speech speed from a detection result, and sets the duration according to the speech speed. With this, for example, in a case where the user speaks in a hurry, the speech ends relatively quickly, whereby the stress of the user can be reduced. In addition, the duration may be changed according to the volume or intonation of voice of the user. A day of week to use or the like may be applied as a setting parameter of the duration. The above-described parameters may be suitably combined.

In the embodiment and the modification examples described above, although category determination or information extraction is performed through communication between the voice recognition device 20 and the vehicle 30, for example, the speech information processing unit 22 may provide the vehicle 30 with information needed for the processing, and the whole voice recognition processing may be executed inside the vehicle 30. The disclosure is not limited to a case where the voice recognition processing is executed inside the vehicle 30. The voice recognition unit 34 or the microphone 36 may be provided in a terminal of the user, and the user may connect the terminal to a server including a speech information processing unit to execute the voice input or the voice recognition processing.

Further effects or modification examples can be easily derived by those skilled in the art. Broader aspects of the disclosure are not limited to the specific details and the representative embodiment shown and described above. Accordingly, various alterations may be made without departing from the spirit or scope of the general inventive concept as defined by the appended claims and equivalents thereof.

What is claimed is:

1. A voice recognition device comprising:
a memory; and
a processor including hardware,
wherein the processor is programmed to extract a word string from voice data, determine a category of the word string, and set a duration of a silent state after transition of the voice data to the silent state based on the determined category, the duration of the silent state being used for determining that an input of the voice data is completed.

2. The voice recognition device according to claim 1, wherein the processor is programmed to determine that the input of the voice data is completed in a case where a silent time elapsed after the transition of the input voice data to the silent state exceeds the duration of the silent state.

3. The voice recognition device according to claim 1, wherein the processor is programmed to determine that the word string is an address, a facility name, or a telephone number from the voice data, and set the duration of the silent state according to the determined address, facility name, or telephone number.

4. The voice recognition device according to claim 1, wherein the processor is programmed to calculate a number of errors of voice recognition in the voice data, and set the duration of the silent state according to the number of errors.

5. The voice recognition device according to claim 1, wherein the processor is programmed to acquire a feature of the voice data from information of a user who uses the voice recognition device, and set the duration of the silent state according to the acquired feature of the voice data.

6. The voice recognition device according to claim 4, wherein the processor is programmed to determine an age of a user, and set the duration of the silent state according to the determined age.

7. The voice recognition device according to claim 1, wherein the processor is programmed to calculate a speech speed from the voice data, and set the duration of the silent state according to the calculated speech speed.

8. A voice recognition method that recognizes voice input, the voice recognition method comprising:
extracting a word string from voice data;
determining a category of the word string; and
setting a duration of a silent state after transition of the voice data to the silent state based on the determined category, the duration of the silent state being used for determining that an input of the voice data is completed.

9. A non-transitory computer readable storage medium that stores a voice recognition program that causes a voice recognition device configured to recognize voice input to execute:
extracting a word string from voice data;
determining a category of the word string; and
setting a duration of a silent state after transition of the voice data to the silent state based on the determined category, the duration of the silent state being used for determining that an input of the voice data is completed.

* * * * *